US011590984B2

(12) United States Patent
Zula et al.

(10) Patent No.: US 11,590,984 B2
(45) Date of Patent: Feb. 28, 2023

(54) CONTROL SYSTEM FOR OPERATOR CONTROLLED VEHICLE SUBSYSTEMS

(71) Applicant: Bendix Commercial Vehicle Systems LLC, Elyria, OH (US)

(72) Inventors: Daniel P. Zula, North Ridgeville, OH (US); Nianqing Zhou, Avon, OH (US); Vadim V. Nikiforov, Elyria, OH (US); Rajkumar Senthilkumar, Grand Blanc, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 385 days.

(21) Appl. No.: 16/600,641

(22) Filed: Oct. 14, 2019

(65) Prior Publication Data

US 2021/0107503 A1  Apr. 15, 2021

(51) Int. Cl.
*B60W 50/10* (2012.01)
*B60R 16/023* (2006.01)
*B60W 50/00* (2006.01)
*B60W 30/10* (2006.01)
*B60W 10/10* (2012.01)

(52) U.S. Cl.
CPC ......... *B60W 50/10* (2013.01); *B60R 16/0231* (2013.01); *B60R 16/0237* (2013.01); *B60R 16/023* (2013.01); *B60W 10/10* (2013.01); *B60W 30/10* (2013.01); *B60W 2050/0075* (2013.01); *B60W 2556/45* (2020.02); *B60W 2756/00* (2020.02)

(58) Field of Classification Search
CPC ............. B60W 50/10; B60W 2556/45; B60W 2050/0075; B60W 10/10; B60W 30/10; B60W 2756/00; B60R 16/0231; B60R 16/0237; B60R 16/023
See application file for complete search history.

(56) References Cited

U.S. PATENT DOCUMENTS

| | | | |
|---|---|---|---|
| 10,003,864 B2 | 6/2018 | Herges et al. | |
| 10,706,648 B2 * | 7/2020 | Plante | G07C 5/085 |
| 2004/0254729 A1 * | 12/2004 | Browne | G01S 13/931 |
| | | | 701/45 |

(Continued)

*Primary Examiner* — Hunter B Lonsberry
*Assistant Examiner* — Jay Khandpur
(74) *Attorney, Agent, or Firm* — Reising Ethington P.C.

(57) ABSTRACT

A control system and method for controlling a vehicle subsystem are provided. The control system includes a remote parameter sensor configured to generate a remote parameter signal indicative of a value of a universal parameter associated with an environment in which a vehicle is operating. The system further includes a local parameter sensor configured to generate a local parameter signal indicative of the value of the universal parameter and a local controller. The controller is configured to receive the local parameter signal along a first signal path, receive the remote parameter signal and a command signal configured for controlling a function of the vehicle subsystem along a second signal path, compare the local and remote parameter signals and implement the function of the vehicle subsystem responsive to the command signal if the remote parameter signal meets a predetermined condition relative to the local parameter signal.

34 Claims, 3 Drawing Sheets

(56) References Cited

U.S. PATENT DOCUMENTS

| | | | |
|---|---|---|---|
| 2015/0343966 A1* | 12/2015 | Petrucci | H04J 3/00 375/257 |
| 2018/0086322 A1 | 3/2018 | Zula et al. | |
| 2018/0284759 A1* | 10/2018 | Michalakis | B60W 50/0097 |
| 2019/0019349 A1* | 1/2019 | Dolgov | G05D 1/0044 |
| 2019/0355257 A1* | 11/2019 | Caldwell | B60W 30/095 |
| 2020/0001857 A1* | 1/2020 | Naylor | B60T 17/228 |

* cited by examiner

CONTROL SYSTEM FOR OPERATOR CONTROLLED VEHICLE SUBSYSTEMS

BACKGROUND OF THE INVENTION a. Field of the Invention

This invention relates to control of vehicle subsystems. In particular, the invention relates to a system and method for processing user inputs used in controlling a vehicle subsystem in which the validity of a command signal generated in response to a user input and transmitted along one signal path is determined by comparing separate measurements of a universal parameter transmitted along the same signal path as the command signal and a different signal path.

b. Background Art

Conventional vehicles include a variety of vehicle subsystems (e.g., braking, steering, cabin environment control) that are controlled in response to user inputs from the vehicle operator or passengers. Some of these subsystems (e.g., braking and steering) are critical to the safe operation of the vehicle. User interfaces and other components of safety-critical vehicle subsystems are expected to meet certain standards for functional safety such as those set forth in International Organization for Standards (ISO) Standard 26262 ("Road Vehicles—Functional Safety"). In order to meet these standards, conventional user interfaces frequently employ redundant signal processing paths for processing and transmitting user input signals. Each signal path leads to a separate microprocessor (or a separate core of a multi-core microprocessor) that interprets the user input signal. The multiple microprocessors (or multiples cores of a single microprocessor) are used to cross-check and verify the user input signal before transmission to a host controller for the vehicle subsystem. Faults in the user interface (and, in particular, in the signal path between the user input device and the microprocessors in the user interface) can be identified based on any non-agreement between the microprocessors in the user interface.

The use of multiple microprocessors for redundant signal processing substantially increases the cost of the user interface and the overall control system for any vehicle subsystem. These costs are multiplied in vehicle subsystems that rely on multiple user inputs. For example, braking systems in some vehicles (e.g., tractor-trailers) often employ multiple user interfaces through which the brakes may be controlled including foot pedals and hand operated controls. The use of redundant signal processing paths and multiple microprocessors to interpret each input substantially increases the cost of the user interfaces and the control system for the vehicle subsystem as a whole.

The inventors herein have recognized a need for a control system for a vehicle subsystem and a method for controlling a vehicle subsystem that will minimize and/or eliminate one or more of the above-identified deficiencies.

BRIEF SUMMARY OF THE INVENTION

This invention relates to control of vehicle subsystems. In particular, the invention relates to a system and method for processing user inputs used in controlling a vehicle subsystem in which the validity of a command signal generated in response to a user input and transmitted along one signal path is determined by comparing separate measurements of a universal parameter transmitted along the same signal path as the command signal and a different signal path. Embodiments of the system for controlling a vehicle subsystem described herein may include components of a "local" control system and a "remote" control system disposed at opposite ends of a signal path between the two systems. The use of "remote" and "local" as used herein is not intended to convey relative physical locations, but is instead intended to convey a hierarchy in terms of control of a vehicle subsystem. In particular, the "local" control system directly controls the vehicle subsystem while the "remote" control system does not directly control the vehicle subsystem, but instead provides requests or commands to the local control system over the signal path for the control of the subsystem.

A control system for a vehicle subsystem in accordance with one embodiment includes a local parameter sensor configured to generate a local parameter signal indicative of a value of a universal parameter associated with an environment in which a vehicle is operating. The system further includes a local controller configured to receive the local parameter signal along a first signal path. The local controller is further configured to receive a command signal along a second signal path. The command signal is configured for controlling a function of the vehicle subsystem. The local controller is further configured to receive a remote parameter signal along the second signal path. The remote parameter signal is generated by a remote parameter sensor and indicative of the value of the universal parameter. The local controller is further configured to compare the local parameter signal and the remote parameter signal and to implement the function of the vehicle subsystem responsive to the command signal if the remote parameter signal meets a predetermined condition relative to the local parameter signal.

A control system for a vehicle subsystem in accordance with another embodiment includes a remote parameter sensor configured to generate a remote parameter signal indicative of a value of a universal parameter associated with an environment in which a vehicle is operating. The system further includes a local parameter sensor configured to generate a local parameter signal indicative of the value of the universal parameter. The system further includes a local controller configured to receive the local parameter signal along a first signal path. The controller is further configured to receive a command signal configured for controlling a function of the vehicle subsystem along a second signal path and to receive the remote parameter signal along the second signal path. The local controller is further configured to compare the local parameter signal and the remote parameter signal and implement the function of the vehicle subsystem responsive to the command signal if the remote parameter signal meets a predetermined condition relative to the local parameter signal.

A control system for a vehicle subsystem in accordance with another embodiment includes a remote parameter sensor configured to generate a remote parameter signal indicative of a value of a universal parameter associated with an environment in which a vehicle is operating. The system further includes a remote controller configured to receive a command signal configured for controlling a function of the vehicle subsystem and to generate a processed command signal responsive to the command signal. The remote controller is further configured to receive the remote parameter signal and generate a processed remote parameter signal responsive to the remote parameter signal. The system further includes a local parameter sensor configured to generate a local parameter signal indicative of the value of the universal parameter. The system further includes a local controller configured to receive the local parameter signal along a first signal path and receive the processed command signal and the processed remote parameter signal along a second signal path. The local controller is further configured to compare the local parameter signal and the processed remote parameter signal and implement the function of the vehicle subsystem responsive to the command signal if the processed remote parameter signal meets a predetermined condition relative to the local parameter signal.

A method for controlling a vehicle subsystem in accordance with one embodiment includes the step of generating a command signal configured for controlling a function of the vehicle subsystem. The method further includes the steps of generating a remote parameter signal from a remote parameter sensor indicative of a value of a universal parameter associated with an environment in which a vehicle is operating and generating a local parameter signal from a local parameter sensor indicative of the value of the universal parameter. The method further includes the step of transmitting the local parameter signal to a local controller for the vehicle subsystem along a first signal path. The method further includes the steps of transmitting a processed command signal generated by a remote controller for the vehicle subsystem responsive to the command signal from the remote controller to the local controller along a second signal path and transmitting a processed remote parameter signal from the remote controller to the local controller along the second signal path. The method further includes the steps of comparing the processed remote parameter signal and the local parameter signal and implementing a function of the vehicle subsystem responsive to the processed command signal if the processed remote parameter signal meets a predetermined condition relative to the local parameter signal.

A control system for a vehicle subsystem in accordance with one embodiment includes a local parameter sensor configured to generate a local parameter signal indicative of a value of a universal parameter associated with an environment in which a vehicle is operating. The system further includes a local controller configured to receive the local parameter signal along a first signal path and receive a command signal along a second signal path. The command signal is configured for controlling a function of the vehicle subsystem and is indicative of the value of the universal parameter. The controller is further configured to compare the local parameter signal and the command signal and implement the function of the vehicle subsystem responsive to the command signal if the remote parameter signal meets a predetermined condition relative to the command signal.

A system and method for controlling a vehicle subsystem in accordance with present teachings represents an improvement as compared to conventional systems and methods for controlling vehicle subsystems. In particular, the system and method enable verification of the validity of a command signal corresponding to a user input in safety critical applications without the need for redundant signal processing paths for the signal. The system and method eliminate the need for multiple microprocessors (or a multi-core microprocessor) for cross-checking and verifying the signal thereby reducing the cost of the user interface and the control system for the vehicle subsystem as a whole.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
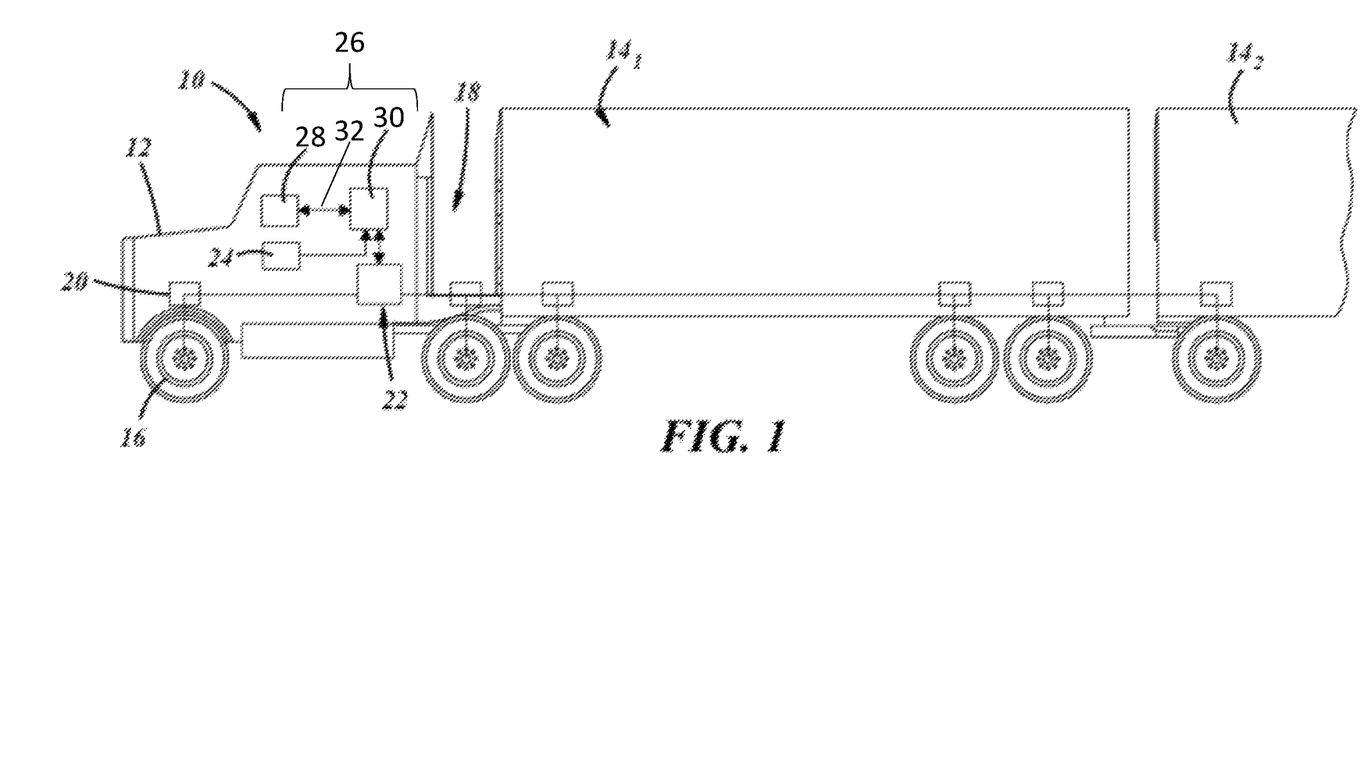
FIG. 1 is a diagrammatic view of a vehicle incorporating a control system for a subsystem of the vehicle in accordance with the present teachings.

Referring now to the drawings wherein like reference numerals are used to identify identical components in the various views, FIG. 1 illustrates a vehicle 10. In the illustrated embodiment, vehicle 10 comprises a heavy commercial vehicle and, in particular, a tractor-trailer (also referred to as a semi) containing a tractor or power unit 12 and one or more trailers or towed units $14_1 \ldots 14_N$. It should be understood, however, that the inventions disclosed herein may find application on other types of commercial vehicles including, for example, tractors operating without trailers, buses, etc. and may also find application on non-commercial vehicles. Tractor 12 contains a power unit, such as an internal combustion engine, and steering and drive axles each of which support one or more wheels 16 at either end. Trailers $14_1 \ldots 14_N$ are provided to store freight and are detachably coupled to tractor 12. Each trailer 14 is supported on one or more trailer axles, each of which may support one or more wheels 16 at either end. Although a pair of trailers 14 are shown in the illustrated embodiment, it should be understood that the number of trailers 14 attached to tractor 12 may vary.

Vehicle 10 includes a variety of vehicle subsystems including a braking subsystem 18. Although a braking subsystem 18 is illustrated herein as an example, it should be understood that the control system and method described herein may find application in a wide variety of vehicle subsystems including vehicle powertrain subsystems, steering subsystems, fuel delivery subsystems, climate-control subsystems, etc. The control system and method described herein provides particular benefit in safety-critical subsystems such as braking subsystem 18. Braking subsystem 18 is configured to brake wheels 16 in order to slow or stop movement of vehicle 10. Braking subsystem 18 may include a plurality of wheel brakes 20, a fluid circuit 22 that supplies fluid pressure to wheel brakes 20, sensors 24 that identify various conditions associated with vehicle 10 and a control system 26 in accordance with the present teachings. Although braking subsystem 18 is described herein as a fluid braking system and, in particular, a pneumatic braking system, it should be understood that the control system and method described hereinbelow could find application in connection with other forms of braking systems.

Wheel brakes 20 are configured to apply a braking force to one or more wheels 16. Brakes 20 may comprise disc brakes in which a carrier supports brake pads on opposite sides of a rotor rotating with the wheel 16 and an actuator causes, responsive to fluid pressure delivered by fluid circuit 22 or another force, movement of a caliper relative to the carrier to move the brake pads into and out of engagement with the rotor. Alternatively, wheel brakes 20 may comprise drum brakes in which an actuator such as a cam or piston causes, responsive to fluid pressure delivered by fluid circuit 22 or another force, movement of one or more brake shoes into engagement with a braking surface in a brake drum rotating with the wheel 16.

Fluid circuit 22 generates fluid pressure within system 18 and controls the delivery of fluid pressure to the actuator of each wheel brake 20. Circuit 22 may include components for generating and storing pressurized fluid including fluid reservoirs, compressors and air dryers and components for routing and delivering fluid pressure to wheel brakes 20 including fluid conduits, glad-hand connectors between the tractor 12 and trailers 14, and a variety of valves including, for example, a foot pedal valve, relay valves, modulator valves, quick release valves, and other valves. An exemplary fluid circuit is disclosed in commonly assigned U.S. patent application Ser. No. 15/943,907, the entire disclosure of which is incorporated herein by reference.

Sensors 24 are provided to identify various conditions associated with vehicle 10 and the surrounding environment that impact the operation of braking system 18. Sensors 24 may include wheel speed sensors that generate signals indicative of the rotational speed of a corresponding wheel 16 and from which controller 26 can determine the speed of vehicle 10 and whether certain wheels 16 are slipping and implement anti-lock braking through control of valves in fluid circuit 22. Sensors 24 may also include pressure sensors that generate signals indicative of the fluid pressure within various fluid conduits in fluid circuit 22. Sensors 24 may also include sensors used to identify other conditions that may impact the operation of braking system 18 including, for example, an engine or transmission speed sensor that generates a signal indicative of the speed of vehicle 10, a steer angle sensor that generates a signal indicative of a steering angle imparted by a vehicle operator to a steering wheel in vehicle 10, a yaw rate sensor that generates a signal indicative of the angular velocity of vehicle 10 about its vertical (yaw) axis and longitudinal and lateral acceleration, load sensors that generate signals indicative of the forces at various locations on vehicle 10, position sensors that monitor the state of the vehicle ignition, brake pedal or other vehicle components and systems, and interlock sensors (in, for example, the cabin door, driver seat and/or seat belt), used to determine the absence of the vehicle operator for purposes of automatically setting the parking brake when the operator forgets to do so.

Control system 26 controls the operation of braking subsystem 18. Control system 26 includes one or more remote control systems 28 and a local control system 30. Each remote control system 28 and local control system 30 are disposed at opposite ends of, and communicate over, a corresponding communication channel or signal path 32. Components of, and associated with, remote control system 28 will sometimes be referred to herein as "remote" while components of, and associated with, local control system 30 will sometimes be referred to herein as "local". The use of "remote" and "local" as used herein is not intended to convey relative physical locations, but is instead intended to convey a hierarchy in terms of control of braking subsystem 18 and, in particular, wheel brakes 20. Local control system 30 is "local" in the sense that system 30 is located at one end of signal path 32 and directly controls wheel brakes 20 through control of valves in fluid circuit 22. Remote control system 28 is "remote" in the sense that system 28 is located at the opposite end of signal path 32 and does not directly control wheel brakes 20, but instead provides requests or commands to local control system 30 over signal path 32 for the control of braking subsystem 18.

Figure 2:
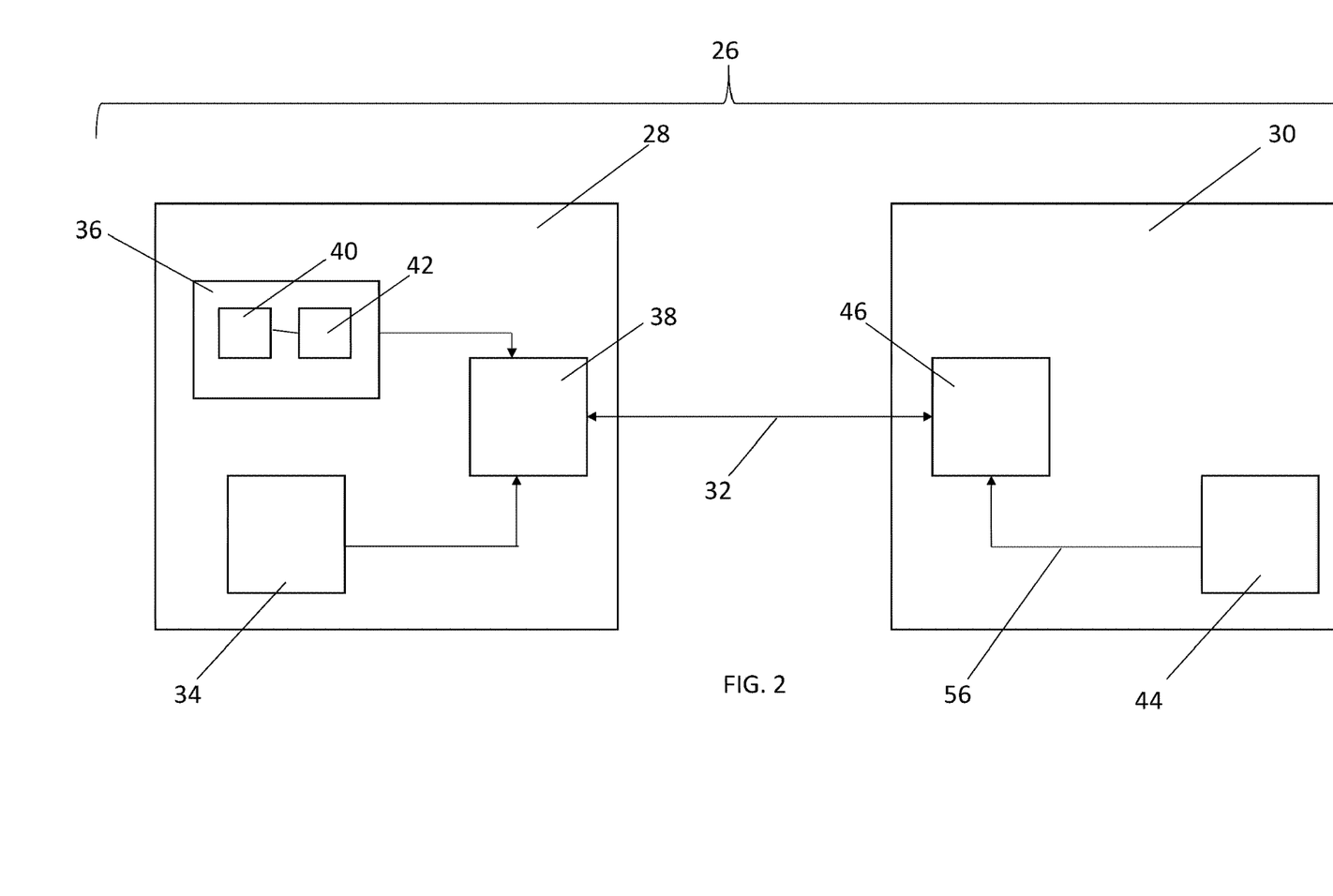
FIG. 2 is a diagrammatic representation of a control system for a vehicle subsystem in accordance with one embodiment of the present teachings.

Referring now to FIG. 2, remote control system 28 provides an interface between the vehicle operator and/or a remote automated system and the braking subsystem 18 through which the operator or automated system can control certain vehicle braking functions and receive information about vehicle braking. In one embodiment, system 28 may include a remote parameter sensor 34, a user interface 36 and a remote controller 38.

Remote parameter sensor 34 is configured to measure a universal parameter and to generate a remote parameter signal indicative of a value of the universal parameter. As used herein, "universal parameter" refers to a parameter that is constant or substantially constant regardless of where the parameter is measured on vehicle 10. Universal parameters may include environmental parameters associated with the surrounding environment for vehicle 10 such as atmospheric pressure, ambient temperature, relative humidity. Universal parameters may also include parameters associated with operation of vehicle 10 that are constant, or substantially constant, throughout vehicle 10 such as acceleration of vehicle 10. Sensor 34 may assume a variety of forms depending on the universal parameter being measured. Sensor 34 may, for example, comprise a pressure sensor configured to measure atmospheric pressure. Sensor 34 may alternatively comprise a temperature sensor configured to measure ambient temperature, a humidity sensor configured to measure relatively humidity, a magnetometer configured to measure the Earth's magnetic field, or an inertial sensor configured to measure acceleration of vehicle 10. It should be understood that the identified sensors are exemplary only and that sensor 34 may assume different forms depending on the universal parameter that is being measured.

User interface 36 is provided to sense a user input and generate a command signal for braking subsystem 18 in response to the user input. Interface 36 may assume a variety of forms. In general, interface 36 includes a mechanical or electrical actuator 40 that responds to a physical movement by the vehicle operator. Actuator 40 may, for example, comprise a foot pedal or a handle disposed within the cabin of tractor 12 (some exemplary actuators are illustrated in U.S. Pub. No. 2018/0086322 A1 the entire disclosure of which is incorporated herein by reference). Actuator 40 may alternatively comprise a touch screen display or microphone assembly that converts voice commands. Interface 36 further includes an input sensor 42 that responds to movement of actuator 40 and generates the command signal corresponding to the movement. Sensor 42 may comprise, for example, a pressure sensor that senses a change in pressure responsive to movement of actuator 40, or an inertial sensor that senses a change in linear or rotational acceleration responsive to movement of actuator 40, or a Hall effect sensor that senses a change in a magnetic field resulting from movement of a magnet by actuator 40. In accordance with one aspect of the present teachings, the configuration of the command signal generated by sensor 42 in response to the user input may itself be dependent on the value of the universal parameter. For example, a command signal generated by inertial sensor 42 will reflect acceleration of actuator 40 as well as acceleration of vehicle 10. In alternative embodiments, remote control system 28 may not include user interface 36 and may instead include an automated system that generates the command signal in response to one or more conditions. For example, an automated emergency braking system may generate a command signal for braking subsystem 18 in response to an object detected by a collision avoidance sensor as opposed to a user input.

Remote controller 38 is configured to process the remote parameter signal and the command signal and provide a processed remote parameter signal and process command signal to local control system 30 along signal path 32. In an alternative embodiment, controller 38 may be omitted and remote parameter sensor 34 and input sensor 42 of interface 36 or an automated system may provide the remote parameter signal and command signal directly to local control system 30 along signal path 32. Remote controller 38 may also be configured to perform a cross-check or verification function with local control system 30 as described in greater detail below. Remote controller 38 may comprise a programmable microprocessor or microcontroller or may comprise an application specific integrated circuit (ASIC). Remote controller 38 may include a memory and a central processing unit (CPU). Remote controller 38 may also include an input/output (I/O) interface including a plurality of input/output pins or terminals through which the controller 38 may receive a plurality of input signals and transmit a plurality of output signals. The input signals may include signals received from sensors 34, 42 or automated systems. The output signals may include signals transmitted to local control system 30 along signal path 32. Controller 38 may be configured to communicate with local control system 30 over a conventional vehicle communication bus such as a controller area network (CAN) (or another communication medium such as power line communication (PLC)). In alternative embodiments, controller 38 may be configured to communicate wirelessly with local control system 30 over signal path 32 using various industry standard short-range wireless communication protocols such as Bluetooth, Wi-Fi (IEEE 802.11), or Zigbee.

Local control system 30 generates control signals for wheel brakes 20 responsive to inputs from sensors 24, remote control systems 28 and other vehicle systems such as collision avoidance or other advanced drive assistance systems. Local control system may include a local parameter sensor 44 and a local controller 46.

Local parameter sensor 44 is configured to measure a universal parameter associated with an environment in which vehicle 10 is operating to and to generate a local parameter signal indicative of a value of the universal parameter. In accordance with the present teachings, local parameter sensor 44 measures the same universal parameter as remote parameter sensor 34 in remote control system 28. Sensor 44 may again take on a variety of forms depending on the universal parameter being measured and provides the local parameter signal directly to controller 46.

Local controller 46 controls the operation of fluid circuit 22 in order to control the fluid pressure delivered to wheel brakes 20 and, therefore, the braking force applied to the wheels 16. Local controller 46 may be configured to implement parking/emergency braking and service braking as well as anti-lock braking (ABS), traction control and stability control when required. Local controller 46 may also control the outputs of certain user interfaces including brake status indicators. Local controller 46 may also be configured to perform a cross-check or verification function with remote controller 38 as described in greater detail below. Local controller 46 may comprise a programmable microprocessor or microcontroller or may comprise an application specific integrated circuit (ASIC). Local controller 46 may include a memory and a central processing unit (CPU). Controller 46 may also include an input/output (I/O) interface including a plurality of input/output pins or terminals through which the controller 46 may receive a plurality of input signals and transmit a plurality of output signals. The input signals may include signals received from sensors 24, components of remote control system 28 and local parameter sensor 44. The output signals may include signals used to control fluid circuit 22 and signals used to control outputs on user interfaces as well as cross-check signals to remote controller 38 as described below. Controller 46 may be configured to communicate with components of braking subsystem 18 such as fluid circuit 22 and sensors 24 and to communicate with remote control system 28 over a conventional vehicle communication bus such as a controller area network (CAN) (or another communication medium such as power line communication (PLC)) and to communicate with other vehicle systems over the same or a similar bus including, for example, advanced driver assistance systems such as collision avoidance systems that are configured to implement automated emergency braking of the vehicle wheels 16 under certain conditions. In alternative embodiments, controller 46 may be configured to communicate wirelessly with one or more components of braking subsystem 18 and/or remote control system 28 using various industry standard short-range wireless communication protocols such as Bluetooth, Wi-Fi (IEEE 802.11), or Zigbee.

Figure 3:
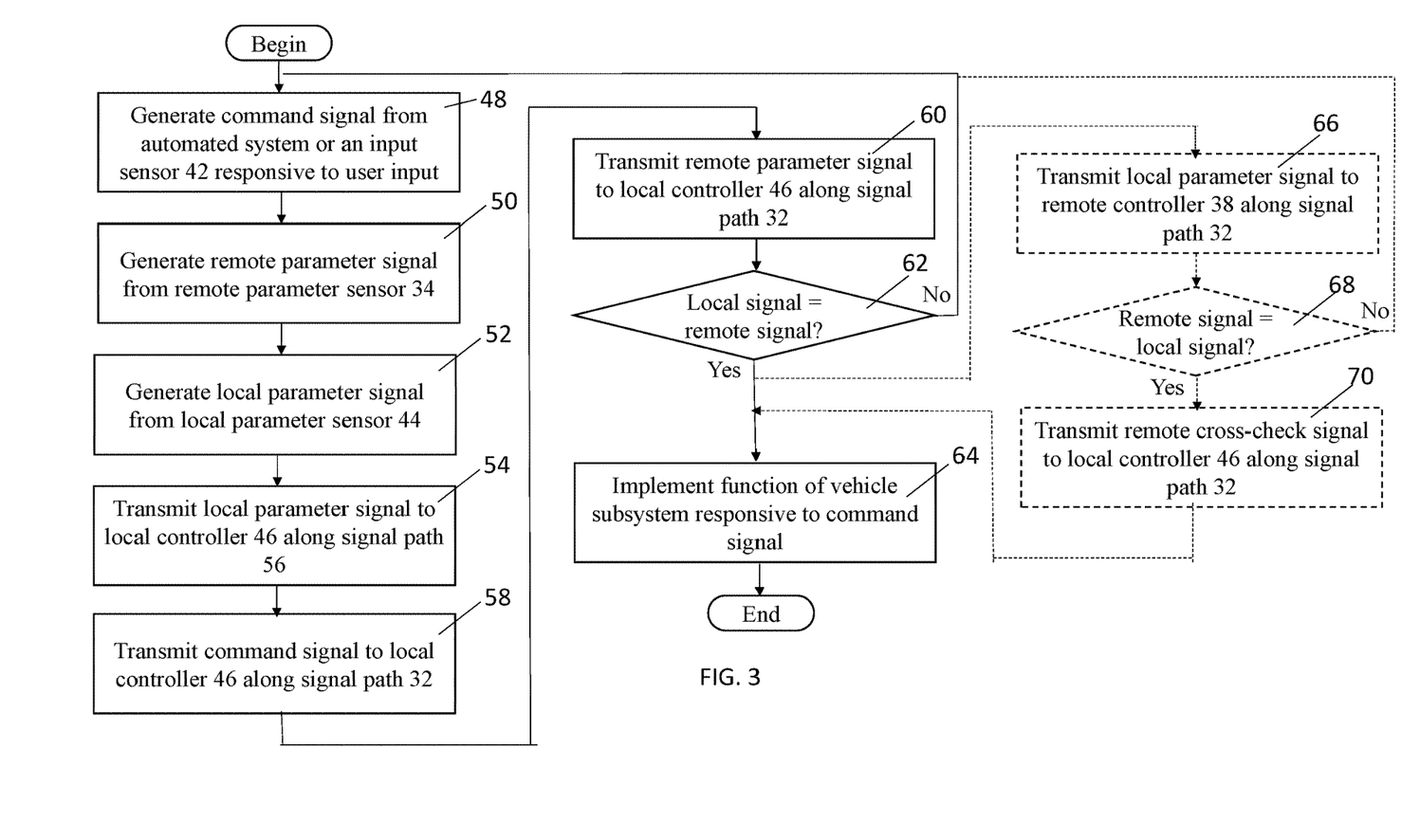
FIG. 3 is a flowchart illustrating a method for controlling a vehicle subsystem in accordance with one embodiment of the present teachings.

Referring now to FIG. 3, controller 38 of remote control system 28 and controller 46 of local control system 30 may be configured with appropriate programming instructions (i.e., software or a computer program) to implement a method for controlling a vehicle subsystem such as braking subsystem 18. The method may begin with the step 48 of generating a command signal from input sensor 42 responsive to a user input or from an automated system. As described hereinabove, the vehicle operator may provide a user input through actuator 40 that is measured by sensor 42 which in turn generates a command signal intended to influence the operation of braking subsystem 18. Alternatively, automated systems may generate the command signal in response to one or more conditions. The method may further include the steps 50, 52 of generating a remote parameter signal from a remote parameter sensor 34 and a local parameter signal from a local parameter sensor 44, respectively, indicative of a value of a universal parameter associated with an environment in which vehicle 10 is operating. As discussed above, the universal parameter may, for example, comprise atmospheric pressure.

The method may continue with the step 54 of transmitting the local parameter signal to local controller 46 along one signal path. Referring to FIG. 2, sensor 44 may transmit the local parameter signal to local controller 46 along a signal path 56. Signal path 56 is different from signal path 32. Signal path 56 may be a simple conductive path (where sensor 44 and controller 46 are disposed on a common circuit board), wire or bus. The method may further include the steps 58, 60 of transmitting a processed command signal and processed remote parameter signal, respectively, from remote controller 38 to local controller 46 along signal path 32. In an embodiment where controller 38 is omitted, steps 56, 58 may comprise transmitting the (unprocessed) command and remote parameter signals directly from user interface 36 or an automated system and remote parameter sensor 34 to local controller 46 over signal path 32.

The method may continue with the step 62 of comparing the local parameter signal received from local parameter sensor 44 and the processed (or unprocessed) remote parameter signal received from remote controller 38 (or directly from remote parameter sensor 34). The comparison is intended to determine whether the remote parameter signal meets a predetermined condition relative to the local parameter signal and to thereby provide an indication that signals transmitted along signal path 32 (and possibly through controller 38) are valid and have not been compromised through, for example, signal interference or improper functioning of a component of remote control system 28. By comparing signals of a common universal parameter transmitted over signal path 32 and measured locally and transmitted over a different signal path 56, local controller 46 is able to evaluate the validity of signals, such as the command signal, sent over signal path 32. As a result, redundant signal processing in remote control system 28 to confirm the validity of a signal prior to transmission to local control system 30 is not required and the number of components within remote control system 28—and particularly the number of microprocessors—can be reduced to reduce the cost of remote control system 28 and control system 26 as a whole. In comparing the remote parameter signal and the local parameter signal, controller 46 may interrogate the signals to determine whether the values of the universal parameter indicated by the two signals are equal or are at least within a predetermined range (e.g., differ by no more than a predetermined percentage). If the comparison indicates that the remote parameter signal does not meet the predetermined condition relative to the local parameter signal, controller 46 may determine that signals transmitted along signal path 32 (including the command signal from input sensor 42) cannot be verified as accurate and either refuse to act in response to the command signal or require some additional acts to verify the command signal before taking action in response to the command signal.

If the remote parameter signal does meet the predetermined condition relative to the local parameter signal, the method may conclude with the step 64 of implementing a function of the braking subsystem 18 responsive to the command signal (or processed command signal). Step 64 may, for example, include generating one or more control signals for a component of braking subsystem 18.

In another embodiment of the method shown in dashed lines in FIG. 3, remote controller 38 and local controller 46 may also perform a cross-check to further verify the integrity of signal path 32 and the command signal before proceeding to step 64. In particular, before or after step 62, the method may include the step 66 in which local controller 46 transmits a processed local parameter signal corresponding to the local parameter signal received from local parameter sensor 44 to remote controller 38. In step 68, remote controller 38 compares the processed local parameter signal to the remote parameter signal received from remote parameter sensor 34. The comparison is intended to determine whether the processed local parameter signal meets a predetermined condition relative to the remote parameter signal and to thereby provide another indication that signals transmitted along signal path 32 are valid. Remote controller 38 may again interrogate the processed local parameter signal and the remote parameter signal to determine whether the values of the universal parameter indicated by the two signals are equal or are at least within a predetermined range (e.g., differ by no more than a predetermined percentage). Remote controller 38 may apply the same predetermined condition as applied in step 62 by local controller 46 or may apply a different predetermined condition (e.g., the cross-check may apply a greater or less stringent standard, allowing less or greater deviation, respectively, than the condition tested by local controller 46). In step 70, remote controller 38 transmits, and local controller 46 receives, a remote cross-check signal indicating whether the processed local parameter signal meets the predetermined condition relative to the remote parameter signal (in some embodiments, local controller 46 may also transmit, and remote controller 38 may receive, a local cross-check signal following step 60 indicating whether the processed remote parameter signal meets the predetermined condition relative to the local parameter signal as determined by local controller 46). If the remote cross-check signal indicates that the processed local parameter signal does not meet the predetermined condition relative to the remote parameter signal, controller 46 may determine that signals transmitted along signal path 32 (including the command signal from input sensor 42) cannot be verified as accurate and either refuse to act in response to the command signal or require some additional acts to verify the command signal before taking action in response to the command signal. If the remote cross-check signal indicates that the processed local parameter signal does meet the predetermined condition relative to the remote parameter signal, the method may proceed to step 64 discussed above.

A system 26 and method for controlling a vehicle subsystem 16 in accordance with present teachings represents an improvement as compared to conventional systems and methods for controlling vehicle subsystems. In particular, the system 26 and method enable verification of the validity of a command signal corresponding to a user input in safety critical applications without the need for redundant signal processing paths for the signal. The system 26 and method eliminate the need for multiple microprocessors (or a multi-core microprocessor) for cross-checking and verifying the signal thereby reducing the cost of the user interface and the control system for the vehicle subsystem as a whole.

While the invention has been shown and described with reference to one or more particular embodiments thereof, it will be understood by those of skill in the art that various changes and modifications can be made without departing from the spirit and scope of the invention.

What is claimed is:

1. A control system for a vehicle subsystem, comprising:
   a local parameter sensor configured to generate a local parameter signal indicative of a value of a universal parameter associated with an environment in which a vehicle is operating; and,
   a local controller configured to
   receive the local parameter signal along a first signal path;
   receive a command signal along a second signal path, the command signal configured for controlling a function of the vehicle subsystem;
   receive a remote parameter signal along the second signal path, the remote parameter signal generated by a remote parameter sensor and indicative of the value of the universal parameter;
   compare the local parameter signal and the remote parameter signal; and,
   implement the function of the vehicle subsystem responsive to the command signal if the remote parameter signal meets a first predetermined condition relative to the local parameter signal.

2. The control system of claim 1 wherein the local controller is further configured, in implementing the function of the vehicle subsystem, to generate a control signal for a component of the vehicle subsystem.

3. The control system of claim 1 wherein a configuration of the command signal is dependent on the value of the universal parameter.

4. The control system of claim 1 wherein the universal parameter comprises one of temperature, humidity, atmospheric pressure, geomagnetism, and inertia.

5. The control system of claim 1 wherein the local controller is further configured to:

transmit a processed local parameter signal corresponding to the local parameter signal to a remote controller that is also configured to receive the remote parameter signal;

receive a remote cross-check signal from the remote controller indicating whether the processed local parameter signal meets a second predetermined condition relative to the remote parameter signal;

implement the function of the vehicle subsystem responsive to the command signal if the remote parameter signal meets the first predetermined condition relative to the local parameter signal and the remote cross-check signal indicates the processed local parameter signal meets the second predetermined condition relative to the remote parameter signal.

6. The control system of claim 5 wherein the local controller is further configured to transmit a local cross-check signal to the remote controller indicating whether the remote parameter signal meets the first predetermined condition relative to the local parameter signal.

7. The control system of claim 1 wherein the command signal is generated by an input sensor responsive to a user input.

8. A control system for a vehicle subsystem, comprising:
a remote parameter sensor configured to generate a remote parameter signal indicative of a value of a universal parameter associated with an environment in which a vehicle is operating;
a local parameter sensor configured to generate a local parameter signal indicative of the value of the universal parameter; and,
a local controller configured to
receive the local parameter signal along a first signal path;
receive a command signal along a second signal path, the command signal configured for controlling a function of the vehicle subsystem;
receive the remote parameter signal along the second signal path;
compare the local parameter signal and the remote parameter signal; and,
implement the function of the vehicle subsystem responsive to the command signal if the remote parameter signal meets a first predetermined condition relative to the local parameter signal.

9. The control system of claim 8 wherein the local controller is further configured, in implementing the function of the vehicle subsystem, to generate a control signal for a component of the vehicle subsystem.

10. The control system of claim 8 wherein a configuration of the command signal is dependent on the value of the universal parameter.

11. The control system of claim 8 wherein the universal parameter comprises one of temperature, humidity, atmospheric pressure, geomagnetism, and inertia.

12. The control system of claim 8 wherein the local controller is further configured to:
transmit a processed local parameter signal corresponding to the local parameter signal to a remote controller that is also configured to receive the remote parameter signal;
receive a remote cross-check signal from the remote controller indicating whether the processed local parameter signal meets a second predetermined condition relative to the remote parameter signal;
implement the function of the vehicle subsystem responsive to the command signal if the remote parameter signal meets the first predetermined condition relative to the local parameter signal and the remote cross-check signal indicates the processed local parameter signal meets the second predetermined condition relative to the remote parameter signal.

13. The control system of claim 12 wherein the local controller is further configured to transmit a local cross-check signal to the remote controller indicating whether the remote parameter signal meets the first predetermined condition relative to the local parameter signal.

14. The control system of claim 8, further comprising an input sensor configured to generate the command signal responsive to a user input.

15. A control system for a vehicle subsystem, comprising:
a remote parameter sensor configured to generate a remote parameter signal indicative of a value of a universal parameter associated with an environment in which a vehicle is operating;
a remote controller configured to
receive a command signal configured for controlling a function of the vehicle subsystem;
generate a processed command signal responsive to the command signal;
receive the remote parameter signal;
generate a processed remote parameter signal responsive to the remote parameter signal;
a local parameter sensor configured to generate a local parameter signal indicative of the value of the universal parameter; and,
a local controller configured to
receive the local parameter signal along a first signal path;
receive the processed command signal and the processed remote parameter signal along a second signal path;
compare the local parameter signal and the processed remote parameter signal; and,
implement the function of the vehicle subsystem responsive to the command signal if the processed remote parameter signal meets a first predetermined condition relative to the local parameter signal.

16. The control system of claim 15 wherein the local controller is further configured, in implementing the function of the vehicle subsystem, to generate a control signal for a component of the vehicle subsystem.

17. The control system of claim 15 wherein a configuration of the command signal is dependent on the value of the universal parameter.

18. The control system of claim 15 wherein the universal parameter comprises one of temperature, humidity, atmospheric pressure, geomagnetism, and inertia.

19. The control system of claim 15 wherein the local controller is further configured to:
transmit a processed local parameter signal corresponding to the local parameter signal to the remote controller;
receive a remote cross-check signal from the remote controller indicating whether the processed local parameter signal meets a second predetermined condition relative to the remote parameter signal; and,
implement the function of the vehicle subsystem responsive to the command signal if the processed remote parameter signal meets the first predetermined condition relative to the local parameter signal and the remote cross-check signal indicates the processed local parameter signal meets the second predetermined condition relative to the remote parameter signal.

20. The local control system of claim 19 wherein the local controller is further configured to transmit a local cross-check signal to the remote controller indicating whether the processed remote parameter signal meets the first predetermined condition relative to the local parameter signal.

21. The control system of claim 15, further comprising an input sensor configured to generate the command signal responsive to a user input.

22. A method for controlling a vehicle subsystem, comprising the steps of:
generating a command signal configured for controlling a function of the vehicle subsystem;
generating a remote parameter signal from a remote parameter sensor indicative of a value of a universal parameter associated with an environment in which a vehicle is operating;
generating a local parameter signal from a local parameter sensor indicative of the value of the universal parameter;
transmitting the local parameter signal to a local controller for the vehicle subsystem along a first signal path;
transmitting a processed command signal generated by a remote controller for the vehicle subsystem responsive to the command signal from the remote controller to the local controller along a second signal path;
transmitting a processed remote parameter signal from the remote controller to the local controller along the second signal path;
comparing the processed remote parameter signal and the local parameter signal; and,
implementing the function of the vehicle subsystem responsive to the processed command signal if the processed remote parameter signal meets a first predetermined condition relative to the local parameter signal.

23. The method of claim 22 wherein a configuration of the command signal is dependent on the value of the universal parameter.

24. The method of claim 22 wherein the universal parameter comprises one of temperature, humidity, atmospheric pressure, geomagnetism, and inertia.

25. The method of claim 22, further comprising the steps of:
transmitting a processed local parameter signal corresponding to the local parameter signal from the local controller to the remote controller;
receiving a remote cross-check signal from the remote controller indicating whether the processed local parameter signal meets a second predetermined condition relative to the remote parameter signal; and,
implementing the function of the vehicle subsystem responsive to the command signal if the processed remote parameter signal meets the first predetermined condition relative to the local parameter signal and the remote cross-check signal indicates the processed local parameter signal meets the second predetermined condition relative to the remote parameter signal.

26. The method of claim 25, further comprising the step of transmitting a local cross-check signal from the local controller to the remote controller indicating whether the processed remote parameter signal meets the first predetermined condition relative to the local parameter signal.

27. The method of claim 22 wherein the command signal is generated by an input sensor responsive to a user input.

28. A control system for a vehicle subsystem, comprising:
a local parameter sensor configured to generate a local parameter signal indicative of a value of a universal parameter associated with an environment in which a vehicle is operating; and,
a local controller configured to
receive the local parameter signal along a first signal path;
receive a command signal along a second signal path, the command signal configured for controlling a function of the vehicle subsystem and indicative of the value of the universal parameter;
compare the local parameter signal and the command signal; and,
implement the function of the vehicle subsystem responsive to the command signal if the local parameter signal meets a first predetermined condition relative to the command signal.

29. The control system of claim 28 wherein the local controller is further configured, in implementing the function of the vehicle subsystem, to generate a control signal for a component of the vehicle subsystem.

30. The control system of claim 28 wherein a configuration of the command signal is dependent on the value of the universal parameter.

31. The control system of claim 28 wherein the universal parameter comprises one of temperature, humidity, atmospheric pressure, geomagnetism, and inertia.

32. The control system of claim 28 wherein the local controller is further configured to:
transmit a processed local parameter signal corresponding to the local parameter signal to a remote controller that is also configured to receive the command signal;
receive a remote cross-check signal from the remote controller indicating whether the processed local parameter signal meets a second predetermined condition relative to the command signal;
implement the function of the vehicle subsystem responsive to the command signal if the command signal meets the first predetermined condition relative to the local parameter signal and the remote cross-check signal indicates the processed local parameter signal meets the second predetermined condition relative to the command signal.

33. The control system of claim 32 wherein the local controller is further configured to transmit a local cross-check signal to the remote controller indicating whether the command signal meets the first predetermined condition relative to the local parameter signal.

34. The control system of claim 28 wherein the command signal is generated by an input sensor responsive to a user input.

* * * * *